United States Patent
Dillinger et al.

(10) Patent No.: US 7,853,247 B2
(45) Date of Patent: Dec. 14, 2010

(54) METHOD FOR CONFIGURING A MOBILE TERMINAL, CONFIGURABLE MOBILE TERMINAL AND MOBILE RADIO NETWORK THEREFOR

(75) Inventors: Markus Dillinger, Oberhaching (DE); Rainer Falk, Eching (DE); Egon Schulz, München (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 803 days.

(21) Appl. No.: 11/658,963

(22) PCT Filed: Apr. 15, 2005

(86) PCT No.: PCT/EP2005/051666
§ 371 (c)(1),
(2), (4) Date: Jul. 20, 2007

(87) PCT Pub. No.: WO2006/013116
PCT Pub. Date: Feb. 9, 2006

(65) Prior Publication Data
US 2008/0305784 A1 Dec. 11, 2008

(30) Foreign Application Priority Data
Jul. 30, 2004 (DE) .............. 10 2004 036 991

(51) Int. Cl.
*H04M 3/00* (2006.01)
(52) U.S. Cl. .............. 455/418; 455/412.1; 455/552.1
(58) Field of Classification Search ......... 455/418–420, 455/90.1–90.2, 414.1, 412.1, 552.1
See application file for complete search history.

(56) References Cited

U.S. PATENT DOCUMENTS 6,493,751 B1 * 12/2002 Tate et al. ............ 709/221
7,548,523 B2 * 6/2009 Babbar et al. ............ 370/331
2003/0100297 A1 * 5/2003 Riordan et al. ............ 455/418

FOREIGN PATENT DOCUMENTS

| EP | 1 233 636 A2 | 8/2002 |
| WO | 03/017706 A1 | 2/2003 |
| WO | WO 03/043367 A1 | 5/2003 |

OTHER PUBLICATIONS

Mehta et al.: "Reconfigurable Terminals: An Overview of Architectural Solutions", Communications Magazine, pp. 82-89, IEEE Service Center, Piscataway, USA, Aug. 2001.
Olaziregi et al.: "Software Defined Radio Forum Contribution Architectures supporting SDR Terminals", Aug. 22, 2001.
Anonymous: "Requirements for Radio Software Download for RF Reconfiguration", SDR Forum, pp. 1-41, Nov. 13, 2002, www.mmitsforum.org/public/approved/02_a_0007_v0_00_dl_req_01_22_03.pdf.

* cited by examiner

*Primary Examiner*—CongVan Tran
(74) *Attorney, Agent, or Firm*—Laurence A. Greenberg; Werner H. Stemer; Ralph E. Locher (57) ABSTRACT

A method for configuring a mobile terminal wherein a basic configuration for use of the mobile terminal in differently organized communication networks is set up in the mobile terminal. The basic configuration for use of the mobile terminal in a particular communication network of the communication networks is modified by a change, for which purpose data for a configuration specific to the particular network is loaded into the mobile terminal. The change remains available during the use of the mobile terminal in the particular communication network. Correspondingly a suitable mobile terminal and a suitably embodied mobile radio network implement the method.

20 Claims, 6 Drawing Sheets

```
<Config>
 <Radio>
 <FrequencyBand>
   <NetworkControl>READ</NetworkControl>
   <LOW> 1.8GHz </LOW>
   <HIGH> 1.9 GHz </HIGH>
 <FrequencyBand>
 <Channel>
   <NetworkControl>READ,MODIFY</NetworkControl>
   <Value> 25 MHz </Value>
 </Channel>
 <Modulation>
   <NetworkControl>READ,MODIFY</NetworkControl>
   <Value> GMSK </Value>
 </Modulation>
 <Radio>

<Applications>
   <NetworkControl>NONE</NetworkControl>
   <Application>
     <Name> SMail </Name>
     <Provider> Siemens Mobile</Provider>
     <URL> http://www.my-mobile.com/download/smail-314.jad</URL>
   <Application>
   <Application>
     <Name> PingPong </Name>
     <Provider> TheGameFactory </Provider>
     <URL> http://www.thegamefactory.com/pingpong-s55.jad</URL>
   <Application>
 </Applications>
</Config>
```

FIG 3B

Konfiguration K-KN1:

```
<Config>
  <Radio>
   <Modulation>
     <Value> QAM64 </Value>
   </Modulation>
  <Radio>
</Config>
```

Konfiguration K-KN2:

```
<Config>
  <Radio>
   <Channel>
     <Value> 12.5 MHz </Value>
   </Channel>
   <Modulation>
     <Value> FSK </Value>
   </Modulation>
  <Radio>
</Config>
```

METHOD FOR CONFIGURING A MOBILE TERMINAL, CONFIGURABLE MOBILE TERMINAL AND MOBILE RADIO NETWORK THEREFOR

BACKGROUND OF THE INVENTION

Field of the Invention

The invention relates to a method for configuring a mobile terminal having the pre-characterizing features of claim 1, to a configurable mobile terminal having the pre-characterizing features of claim 11 and to a mobile radio network having the pre-characterizing features of claim 17.

It is generally known that it is possible to use a mobile terminal in the manner of conventional mobile radio devices for, for example, the GSM (Global System for Mobile communications) or UMTS (Universal Mobile Telecommunication System) systems, different frequency bands being provided in these systems for setting up a communication connection. Accordingly, mobile terminals are configured in such a way that they can switch between the available frequencies as necessary. The corresponding configuration of the mobile terminals is in this case carried out on the manufacturer side in the control device, in the memory device and/or in the radio interface of the mobile terminal before it is shipped to a user. However, such a preconfiguration, which takes into account different specific network configurations of different networks, is time-intensive and costly in terms of the hardware and/or software which must be installed by the manufacturer. A subsequent modification of the configuration in particular is either not possible or possible only to a limited extent.

Adaptations of individual configuration features can be made to a limited extent by the operator of the home network in which the mobile terminal or an identification card installed therein is registered. It is possible, for example, to configure a ringtone which can be uploaded into the mobile terminal via a network station of the network currently being used so that said ringtone can be used in future operation independently of the currently used network instead of the ringtone of the basic configuration. Configuring interventions of this kind are therefore new configurations or, as the case may be, reconfigurations of parameters or functions which are not relevant to the setting up of a communication connection to a currently used network.

Possible approaches to sharing the responsibility for the configuration of a mobile terminal have been examined within the framework of the European SCOUT activities (IST SCOUT: Information Society Technologies, Smart user-Centric cOmmUnication Environment).

In this program attention is given among other things to a centralized reconfiguration control for a mobile terminal. A single central unit is responsible for deciding on and performing a reconfiguration. This means that the unit decides which software or, as the case may be, configuration is to be downloaded onto a reconfigurable device and installed on the latter and when the reconfiguration is to take place. In this arrangement the reconfiguration control can be located in a network-based device or directly with the end user. The control over the reconfiguration can in this case lie in particular with the service provider of the subscriber or user of the reconfigurable device, i.e. the mobile terminal. The control can also lie with the manufacturer of the mobile terminal or with an independent reconfiguration service provider selected by the end user.

Also known is a decentralized reconfiguration control. In this case the intention is for the control of the reconfiguration to be distributed over administrative domains or areas, more particularly to be split between a visited network and the service provider of the subscriber or user. Two approaches are considered here. According to one approach with a distributed reconfiguration comprising a reconfiguration decision authority as the central authority, the aim is to reconcile possible conflicts of interest between the administrative domains involved. According to another approach the aim is to perform the distributed reconfiguration by means of a direct interaction between the domains involved without the imposition of a central decision agency as intermediary.

The approach in SCOUT, however, is not to discuss a plurality of communication-network-specific configurations, but simply to explore different methods of organizing changes to an individual configuration of a mobile terminal on a decentralized basis, with the configuration decision and the configuration implementation always being controlled by a single authority, referred to as a "Proxy Reconfiguration Manager".

According to the SCOUT approach, consideration is also given to the possibility of having a reconfiguration be performed by a visited network. A disadvantage of this approach is that a reconfiguration of this kind will change the configuration stored in the mobile terminal. When visiting a different network, possibly even the home network, without a reconfiguration capability, the mobile terminal would no longer work in said further network or home network, or no longer work with regard to selected services and functions.

WO 03/043367 A1 (Sonera) describes roaming in an MMS environment (MMS: Multimedia Messaging Service). The network or a network station supplies the terminal with network services in response to a connection setup request. In order to enable the roaming subscriber, i.e. the subscriber registering in a different network from the home network, to use the services of the visited network, the network station sends the terminal a preparatory message including sufficient information for using the MMS services, the terminal using the information in order to be able to avail itself of the MMS services. The cited publication describes a method wherein a visited network reconfigures a terminal so that it can use MMS services in the currently visited network, e.g. reconfigures the terminal in respect of an address of the MMSC (Multimedia Message Service Center) or a GPRS APN (General Packet Radio Service Access Point Name). After returning to the home network the terminals, in particular mobile telephones, that were previously registered in another network and were reconfigured there are first configured back into the desired state. The method described requires provision to be made in all mobile radio networks for registering mobile telephones to be appropriately configured. At the same time it must be taken into account here that the mobile telephone may previously have been registered in a different mobile radio network and consequently in general any configuration settings must be appropriately reset, in particular if not just the configuration of MMS services is being considered. There is a risk that a mobile network will perform specific configuration changes, not all of which will be reset again by a different network, with the result that incorrect configurations which do not operate in the proper manner can be produced.

Registering in a different mobile radio network causes a change in the configuration of the mobile terminal. If this change is not explicitly reversed, it remains permanently valid. As a general rule this is not desirable, in particular not if the reconfiguration includes not only the setting of configuration parameters for the use of MMS services, but also more extensive configuration options such as the installation, updating, or even deletion/deactivation of applications or plug-ins. For example, merely registering in a possibly not entirely trusted network, such as an openly accessible WLAN hotspot (WLAN: Wireless Local Area Network), could result in applications not desired by the user, e.g. for displaying advertising, being permanently installed.

If information for reconfiguring terminals is provided, as is the most widespread practice, by the sending of a specially formatted short message (SMS: Short Message Service), significant delays in the delivering of said SMS message can lead to a situation where only after a certain time has elapsed are all the parameters set correctly and the communication services able to be used as appropriate.

Profiles, e.g. for WLAN 802.11 adapters, are also generally known: In this case a plurality of profiles are present, from which either the user selects a profile manually or the preferred available profile is selected automatically by the system or, as the case may be, by the mobile terminal. The profiles are set up in advance, however, and cannot be modified by the network currently being used.

In what is referred to as an OMA device management scheme (OMA: Open Mobile Alliance), which should become relevant to future mobile telephones, only a configuration per terminal or mobile telephone is considered. The probable application will consist in the service provider being able to perform the configuration of a mobile telephone.

EP 1233636 (Microsoft) describes configuration security mechanisms for radio interfaces. It discloses a system and a method for assigning security credentials to specific components within a mobile device and for ensuring that only configuration messages having sufficient access privilege to those components are allowed to access them. The security credentials describe which settings may be modified or queried by a particular configuration message. This enables a plurality of reconfiguration managers to modify the configuration of a mobile device, but each only to modify the area for which it is validated. In this case what is involved is a conventional access control for regulating who may do what.

SUMMARY OF THE INVENTION

The object of the invention is to improve a method for configuring a mobile terminal, a configurable mobile terminal and a mobile radio network therefor to enable a more general use.

This object is achieved by the method for configuring a mobile terminal having the features of claim 1, by the configurable mobile terminal having the features of claim 12 and by a communication network having the features of claim 19.

Accordingly a method for configuring a mobile terminal is preferred wherein a basic configuration for use of the mobile terminal MT in differently organized communication networks is set up in the mobile terminal, the basic configuration for use of the mobile terminal in a particular communication network of the communication networks being modified by means of a change, for which purpose data for a configuration specific to the particular network is loaded into the mobile terminal, and the change remaining available in the mobile terminal during the use of the mobile terminal in the particular communication network.

Accordingly a mobile terminal, in particular a mobile terminal for performing such a method, is preferred wherein the mobile terminal can be configured for use in differently embodied communication networks, having a memory device for storing at least one basic configuration which is set up for use of the mobile terminal in differently organized communication networks and for storing additional data, a control device for controlling functions of the mobile terminal, and an interface device enabling the mobile terminal to communicate with a network station of one of the communication networks, the control device and the memory device being embodied to modify the basic configuration for use of the mobile terminal in a particular communication network of the communication networks by means of a change, in addition to load data for a configuration specific to the particular communication network into the mobile terminal via the interface device, and to use the change during the use of the mobile terminal in the particular communication network and keep it available in the mobile terminal.

Accordingly a communication network for setting up and operating a communication connection to at least one mobile terminal and having a network device for providing data that is transmitted to the mobile terminal via the communication connection is preferred wherein the communication network provides, as said data, configuration data for a change to a basic configuration of the mobile terminal, in particular of such a mobile terminal and/or in particular according to such a method, for the subsequent operation of the mobile terminal with the communication connection to said particular communication network in the mobile terminal.

The change therefore entails in particular a reconfiguration for the purpose of setting up the mobile terminal for later use in conjunction with a communication connection to the currently visited or subsequently to be visited communication network. The structural components, i.e. in particular the mobile terminal and the configuration manager of the mobile radio network, are embodied accordingly in terms of construction and functionally set up to perform the method.

Advantageous embodiments are the subject matter of dependent claims.

A method is preferred in particular wherein the change for the specific configuration for use of the mobile terminal in the particular communication network is reversed after its use in this particular communication network.

A method is preferred in particular wherein the change for the specific configuration for use of the mobile terminal in the particular communication network is deleted or deactivated.

A method is preferred in particular wherein the change for the specific configuration for use of the mobile terminal in the particular communication network modifies only permitted areas of the basic configuration.

A method is preferred in particular wherein the change for the specific configuration for use of the mobile terminal in the particular communication network and/or the loading of the data for the change to the specific configuration is initiated by the visited communication network.

A method is preferred in particular wherein the change for the specific configuration for use of the mobile terminal in the particular communication network is stored autonomously for later use in this particular communication network, in particular stored autonomously in the mobile terminal.

A method is preferred in particular wherein the data for the change to the specific configuration for use of the mobile terminal in the particular communication network is retrieved from a memory of the mobile terminal.

A method is preferred in particular wherein the data for the change to the specific configuration for use of the mobile terminal in the particular communication network is retrieved from the particular communication network.

A method is preferred in particular wherein the change to the data for the specific configuration corresponds to a reconfiguration of the basic configuration and/or a supplementary configuration of the basic configuration.

A method is preferred in particular wherein the change to the specific configuration for use of the mobile terminal in the particular communication network is permitted only by certain of the communication networks and/or by previously approved authorities.

A method is preferred in particular wherein the change to the specific configuration for use of the mobile terminal in the particular communication network is permitted only for values permitted by e.g. the user or the user's network operator or a permitted value range.

A mobile terminal is preferred in particular wherein a first storage area is provided in the memory device for permanently storing the basic configuration and a second storage area is provided for temporarily storing a copy of the basic configuration reconfigured by the change as the configuration for use of the mobile terminal in the particular communication network.

A mobile terminal is preferred in particular wherein a storage area is provided in the memory device for storing a basic configuration and a change thereto and a second storage area is also provided for storing a change that has been made. The second storage area serves for logging changes so that these can be reversed again.

A mobile terminal is preferred in particular wherein the control device and the memory device are set up and embodied to reverse the change after use of the mobile terminal in the particular communication network.

A mobile terminal is preferred in particular wherein the control device and the memory device are set up and embodied to store data for the change for later use of the mobile terminal in the particular communication network separately.

A mobile terminal is preferred in particular wherein the control device and the memory device are set up and embodied to permit the change for use of the mobile terminal in the particular communication network only in respect of certain parameters of the basic configuration.

A mobile terminal is preferred in particular wherein the control device and the memory device are set up and embodied to permit the change for use of the mobile terminal only by certain of the communication networks and/or by previously approved authorities or the user of the mobile terminal.

A communication network is preferred in particular having a configuration manager which is embodied to provide the configuration data.

A communication network is preferred in particular having a configuration manager which is embodied and set up to activate the change in the mobile terminal.

A method, mobile terminal or communication network are preferred in particular wherein various of the communication networks are differentiated in respect of connection-relevant parameters for a communication connection that is to be set up.

Advantages are afforded in particular compared with the considerations from SCOUT, where a division of tasks between service provider and currently visited network takes place, in that case, however, without requiring a central "coordinating authority", the Reconfiguration Decision Authority (RDA). The present concept can also be used in conjunction with said central RDA authority, however. In this case too a mobile terminal can hold in reserve a plurality of configurations, each of which is specific to a currently used communication network. This is where the advantage of increased efficiency in particular comes to bear. The problem of robustness occurs less if there is only a single, central authority which alone performs configuration changes. The robustness problem can also occur here if the central RDA is used only in conflicts between administrative domains in order to take the definitive configuration decision, whereas the reconfiguration is otherwise performed under decentralized control.

A method for configuring a reconfigurable mobile terminal is preferred which can be used in a plurality of different communication networks and which enables a currently used communication network to modify the configuration of a mobile terminal directly, i.e. immediately, itself. This modification is performed in particular without the need to use an individual, centralized reconfiguration or device management server that is located in the home domain, i.e. at the location of the user's service provider, whereby the configuration of a mobile terminal can be specifically tailored to different communication networks. This modified configuration, which is defined for a currently used communication network, is only effective during the actual use of said communication network, however. The mobile terminal is configured according to this modified configuration only when it also actually uses the corresponding communication network at the present time, i.e. when the user or his/her mobile terminal is "roaming" in this communication network. A modification of the configuration which is performed by a specific currently used communication network has no influence on the configuration of the mobile terminal when it is used in other communication networks.

A communication-network-specific configuration can be used, for example, for the flexible, dynamic tailoring of radio transmission methods to local conditions (Software Defined Radio) and for software installation and configuration for the purpose of using communication-network-specific services.

The use of the method avoids disadvantages of a single, central reconfiguration manager that is provided, for example, in the home domain, i.e. at the service provider location: The information required for the reconfiguration, e.g. network utilization, connection quality or policy information, i.e. how an adaptation to dynamic characteristics is to be implemented, is present in the currently used network. The currently visited domain does not want to furnish this internal data to potential competitors, i.e. to the home domain of another operator.

Inefficiency in respect of dynamic adaptation, e.g. if the signaling were always required to run via the home domain, is also avoided. This would otherwise lead to a heavy load and to unnecessary delays in respect of, for example, signaling and software download.

It is appropriate to emphasize a multiplicity of advantageous aspects in such methods, mobile terminals and mobile radio networks for controlling the configuration of a reconfigurable mobile terminal which can be used in different communication networks, while at the same time all OSI layers can be taken into consideration. A reconfigurable mobile terminal contains at least one communication-network-specific configuration. The communication-network-specific configuration for a communication network is activated when the mobile terminal uses the communication network. A communication-network-specific configuration for a communication network modifies only such areas of the basic configuration as are definable or modifiable under the control of the communication network, which affords an access control that limits which elements of a communication-network-specific configuration can be changed by the corresponding communication network, and which optionally also allows a limitation of the permitted entries of an element, e.g. discrete enumeration or a value range. In particular a particular communication network receives access to the communication-network-specific configuration assigned to it and can modify same.

Configurations can be preloaded onto the terminal already during its manufacture or installed later by the home network operator. In the case of roaming, the terminal, once registered, can use the new configuration immediately after it has been uploaded or loaded from the memory of the mobile terminal.

The valid RAN configuration designation (RAN: Radio Access Network) can be made known in a common control channel for e.g. inactive or "idle mode" subscribers and in the dedicated signaling channel for active subscribers so that the subscribers use the right setting for the cell selection process and in the case of a handover. The user and/or the home network operator can be informed shortly before the configuration switchover in the visited network. This can be useful for localizing errors in the new configuration that is to be set up.

A particular communication network receives access to its assigned communication-network-specific configuration preferably through the home network, i.e. through the service provider of the user (subscriber) who uses the mobile terminal. If, however, the network operator (service provider) of the home network does not play or no longer plays the familiar, central role of assuming the responsibility for assuring a reliable service for its customers (subscribers), or if there is even no home network at all, e.g. in the case of an autonomous WLAN hotspot without operator connection, then the home network's role of granting a particular communication network access to the configuration assigned to it can also be taken over by an independent reconfiguration service provider or by the user personally.

A communication-network-specific configuration is deactivated when the associated communication network is no longer used. This is the case when a handover takes place to another communication network or when, in an area without adequate radio coverage for the use of this communication network, in a so-called radio "dead spot", e.g. in an underground car park or in a subway without radio coverage, either the mobile terminal is logged off by the communication network or logs itself off, or when no further communication with a base station of the communication network in question has taken place for a certain time (timeout). Deactivation of a communication-network-specific configuration means that the mobile terminal is configured in such a way as though said communication-network-specific configuration were not present. What happens in reality is that either a basic configuration or a communication-network-specific configuration of another communication network is activated.

A configuration can in particular define various of the following characteristics or parameters. These include, for example, definition and/or adaptation of the transmission method used and of the communication protocols used (Software Defined Radio or Software Radio). They also include, for example, frequency range, channel allocation, modulation method, channel coding, media codecs (speech, music, images, video). Also worthy of note are applications e.g. for use of communication-network-specific services. In this way a used communication network can provide users with and install the required software. Examples are a special chat program, a special IMS client (IMS: IP-based Multimedia Subsystem) or, in the case of a WLAN network provided by a department store or a shopping mall, an application which offers the user directions, a product search facility and advertising. This simplifies the introduction of operator-specific or communication-network-specific services, since the client software necessary for their use can be loaded automatically onto the mobile terminal and subsequently deleted if necessary.

Parameters include, for example, address information of communication servers such as proxies, gateways, reconfiguration software download servers, reconfiguration managers) and further configuration data required for access thereto, e.g. password or options such as the protocol to be used.

Further examples are communication-network-specific operator logos, background images, in particular advertising, e.g. in the case of advertising-sponsored hotspots in which, in exchange for internet access, the customer has to look at advertising such as menus or offers of the week on his/her display. In this case, after leaving the special communication network, the original operator logo/background image should reappear without this having to be reset explicitly by the next communication network or the user personally.

A communication network can be characterized by different configurable features, such as, for example, the radio technology used, e.g. GSM/GPRS/EDGE, UTRAN-TDD, UTRAN-FDD, WLAN 802.11a/b/g, 802.20, 802.15, Bluetooth, or such as, for example, identification information, e.g. in accordance with 802.11 SSID, 3GPP Mobile Country Code (MCC), a Mobile Network Code (MNC), a Location Area Code (LAC), a Location Area Identifier (LAI=MCC|MNC|LAC), a Routing Area Code (RAC), a Routing Area Identification (RAI=LAI|RAC), a Cell Identity (CI), a Cell Global Identification (CGI=MCC|MNC|LAC|CI), a Base Station Identity Code (BSIC), a Regional Subscription Zone Identity (RSZI), a Location Number (LN), a Service Area Identification (SAI) in accordance with e.g. 3GPP 23.003, location information, an address of a base station or an access point, in particular IEEE 802 MAC address, or a randomly or pseudo-randomly determined, preferably unique session identifier. By this means a communication-network-specific configuration valid for a particular geographical region can also be defined.

Account can also be taken of security methods or, as the case may be, security information used for logging on to the communication network.

A communication-network-specific configuration can be identified implicitly by the communication network to which it is assigned, or an explicit configuration identification can be assigned. A communication network can also be implicitly characterized in particular by the configuration identification that it signals to a mobile terminal. In other words, in this case the mobile network explicitly signals the configuration identification of the configuration that the mobile terminal is to use in the currently used communication network.

A communication-network-specific configuration can be set up by the mobile terminal itself, i.e. the mobile terminal automatically sets up a network-specific configuration for a communication network used, e.g. in connection with the process for registering with this communication network, or by the home network or by the user's service provider, e.g. by sending a provisioning message or using device management, or by the currently used communication network itself, e.g. by sending a preparatory message or provisioning message or using device or configuration management.

A communication-network-specific configuration for a communication network can be set up in particular when the mobile terminal registers with the communication network or can be set up in connection with a planned or at least possible handover to the communication network. In a further variant, however, a communication-network-specific configuration for a communication network is set up only when the communication network actually wants to make changes compared to the basic configuration. It is also possible that a service provider prepares communication-network-specific configurations for preferred roaming partners.

When a particular communication network is no longer used, the communication-network-specific configuration for this communication network is deactivated again, in particular automatically by the mobile terminal or from within the network by a reconfiguration manager. The deactivation includes, albeit not necessarily, the deletion of the information relating to the communication-network-specific configuration. Preferably said configuration information remains stored so that it can be reactivated if this communication network is used a further time. It does not then have to be initialized once again, which would represent an unnecessary overhead.

A communication-network-specific configuration can preferably be deleted again, e.g. when the assigned communication network is left or when there is a handover from this communication network to another communication network. Deletion is also beneficial after a certain time of non-use of this network-specific configuration and/or in the case of a limited number of network-specific configurations. Displacement methods known from memory caches can be used. Deletion is likewise advantageously possible on instruction by the assigned communication network or by a home network or service provider.

The mobile terminal preferably has a basic configuration that is not communication-network-specific. This specifies the basic settings on which a communication-network-specific configuration can build. This allows only changes to the basic configuration to be made, which is more efficient than defining every communication-network-specific configuration from scratch.

A basic configuration can be specified in a number of different ways: It is permanently predefined by e.g. the manufacturer of the mobile terminal and cannot be changed. It can be defined and modified by the user of the mobile terminal him-/herself. It is defined by the service provider or by the home network of the user or by another reconfiguration service provider, e.g. when the mobile terminal belongs to the user's employer and is administered by same or belongs to the mobile terminal manufacturer which provides such a service.

A basic configuration can also define which characteristics can be modified at all by means of a communication-network-specific configuration. These settings, in particular an access control mechanism, can also be different for different communication networks. In this way known communication networks rated as trusted can be given a greater measure of control than less well-known networks or providers, e.g. private individuals or cafés that provide a hotspot. Furthermore a basic configuration can specify restrictions relating to the permitted entries of the elements of a configuration, namely in particular as a discrete enumeration or value range for permitted entries or, conversely, as a discrete enumeration or value range for disallowed entries. Thus, the basic configuration not only specifies which elements of a configuration can be modified by a particular communication network, but also further restricts which entries can be entered into an element of the configuration.

In a variant, a basic configuration is used directly when the mobile terminal is registered in its home network. That is to say, when the mobile terminal is located in its home network, no network-specific configuration is used or the network-specific configuration is identical to the basic configuration. When the mobile terminal logs on to a different mobile communication network from the home network, a communication-network-specific configuration is set up. This means that changes made by a visited network have no impact on the configuration of the mobile terminal when it is located in another visited network or in its home network. In contrast, changes made by the home network, the service provider or the user are also valid in visited networks.

In addition it is preferably noted for a communication-network-specific configuration whether an element of the configuration contains the default value that was predefined by the basic configuration, or whether it was actually modified by the communication network. Preferably an explicit note is made to record identification information of that communication network which defined or, as the case may be, modified the communication-network-specific configuration. In particular when a malfunction occurs and the configuration of the mobile terminal is investigated as part of a troubleshooting process, it is advantageous to be able to distinguish whether an entry was predefined by the basic configuration or modified by a particular communication network. Identifying the communication network that made the change enables the party responsible for an incorrect configuration to be established, notified and/or barred.

To sum up, on the one hand a greater stability or, as the case may be, robustness is achieved, since the effect of a communication-network-specific configuration that may possibly be undesirable in other communication networks on the currently communicating communication network itself is limited. On the other hand, in particular when a plurality of configurations are stored, an increase in efficiency is achieved, since the configuration does not have to be newly adapted to specific conditions at each handover to another communication network, but instead it is only necessary to reactivate a specific configuration already set up previously.

Improved robustness is produced as a result of the less significant impact of an incorrect or undesirable configuration. The changes to the configuration of a reconfigurable mobile terminal that are made in a particular communication network are only effective in that particular communication network. In other words the changes are transient. The effect can be regarded as a kind of "rollback", i.e. the changes to the configuration made by a particular communication network are reversed when said communication network is no longer used. This enables a visited network to be granted a greater measure of control over the configuration of roaming mobile terminals. If a visited network makes changes to the configuration that possibly prevent the use of some services in other networks, that lead to compatibility problems or that do not correspond to the user's expectations, said changes are automatically reversed again when the corresponding mobile network is no longer used. That is to say that even when a visited mobile network configures a mobile terminal in such a way that it is no longer capable of operating, all that is required is not to use the corresponding mobile network any further. The terminal's operability in other mobile networks is not compromised.

It is, however, possible, though actually canceling the changes, also to store them and reactivate them when the same communication network is used again, thereby producing an increase in efficiency. In this way it is not necessary, each time a user registers with a communication network, for all the communication-network-specific settings to be applied once again by the currently visited network. Furthermore a particular communication network can adapt the communication-network-specific configuration before the actual handover procedure is performed. This means it can adapt the assigned configuration in the manner of a background or shadow configuration.

A communication-network-specific configuration for a particular communication network can advantageously also be set up while another communication network is currently being used. This configuration set up in the background will only be activated when the assigned communication network is also actually used. This avoids strict time requirements for the reconfiguration which occur e.g. when the reconfiguration is carried out as part of the handover. Communication-network-specific configurations can therefore be updated even if they currently are not being used. This can take place at advantageous times, in particular when the mobile terminal is registered with a network that provides a high bandwidth or is only lightly loaded, e.g. in the case of a WLAN hotspot or at night. In particular this enables communication-network-specific configurations of preferred roaming partners to be kept up-to-date.

A principle-dependent prevention of undesirable influences of competing mobile networks is also possible. A particular communication network cannot modify the configuration of a mobile terminal permanently, but only transiently. Transiently means that the changes are only effective when said particular communication network is also actually being used at the present time. When another communication network is used, the changes made have no effect. That means that a plurality of communication networks that are possibly operated by network operators competing with one another cannot, based on principle, make any configuration changes that have a negative impact on the use of a communication network of a competitor.

Despite reconfiguration control by a visited network, a service provider, for example, can still guarantee a reliable service. The basic configuration can be defined for example by a service provider or the user of the reconfigurable mobile terminal. They specify permanent settings that cannot be changed, as well as possible settings that a currently used, visited communication network can define. In this way it is possible to predefine which parts of the mobile terminal configuration can be modified at all by a currently used communication network. This allows a type of access control. This can be the same for all the communication networks or else be defined individually according to each communication network. This allows a service provider to guarantee a reliable service which corresponds to the agreements made with the customer according to the latter's subscription. Known communication networks, e.g. preferred roaming partners, rated as trusted can be granted direct control, while other communication networks are given no possibility whatsoever or only a limited possibility of influencing the configuration.

BRIEF DESCRIPTION OF THE DRAWINGS

An exemplary embodiment is explained in more detail below with reference to the drawing, in which.

DESCRIPTION OF THE PREFERRED EMBODIMENTS

Figure 1:
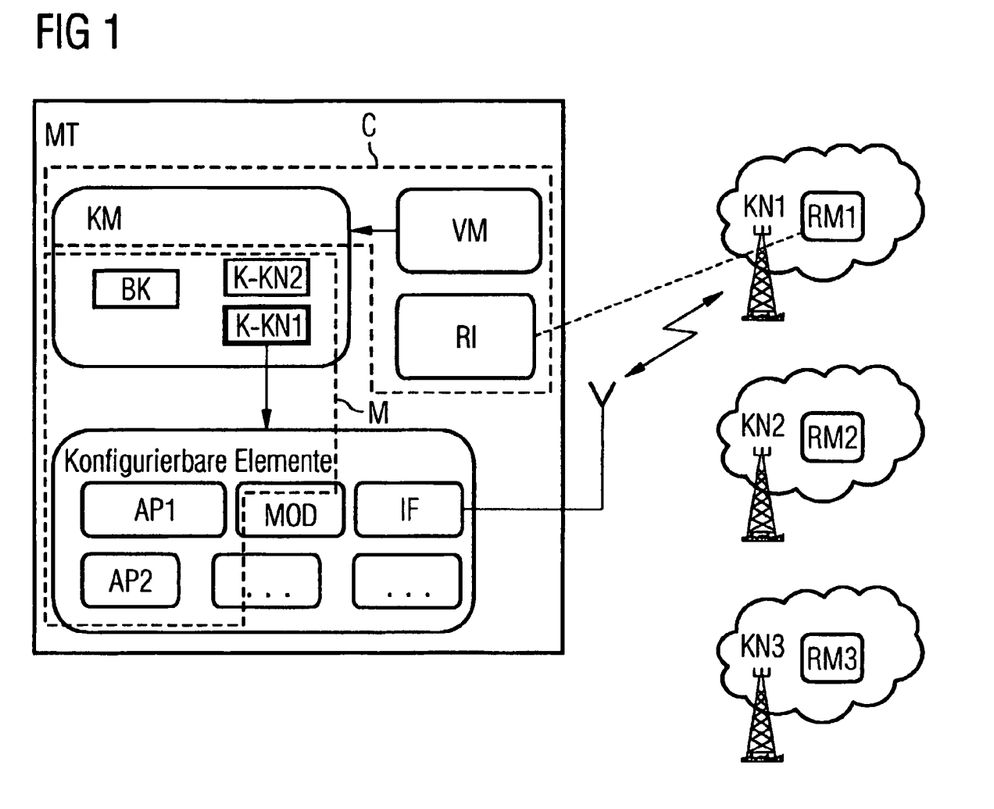
FIG. 1 shows a schematic representation of an arrangement of a reconfigurable mobile terminal in an environment of different radio networks.

FIG. 1 shows an example mobile terminal MT which is currently communicating via an integrated radio interface IF with an access station of a first network, in particular communication network KN1. The mobile terminal MT is also located in the catchment area of two further communication networks KN2, KN3.

The mobile terminal MT has a plurality of components and functions of which only those components and functions necessary to the understanding of the preferred reconfiguration of the mobile terminal MT are described in the following. In this arrangement the individual components can be embodied in the mobile terminal MT as single components separate from one another or as modules. However, an implementation with a single component, in particular an integrated control device C in conjunction with a memory device M, is preferred.

The mobile terminal MT includes in particular a configuration manager KM that is responsible for the configuration of the mobile terminal MT as well as for a reconfiguration.

According to a basic idea of the concept the mobile terminal MT includes at least one basic configuration BK which enables an at least rudimentary communication with networks of different types such as the illustrated communication networks KN1-KN3. In order to adapt the mobile terminal MT to the currently connected communication network in each case, e.g. communication network KN1, the basic configuration is reconfigured transiently by communication-network-specific configurations K-KN1, K-KN2. In this case the reconfiguration is carried out in such a way that after the mobile terminal MT leaves the network the reconfiguration is reversed or can be reversed so that it is returned to the original state with the basic configuration BK.

The mobile terminal MT or its configuration manager KM contains a basic configuration BK and two communication-network-specific configurations K-KN1 and K-KN2. The mobile terminal MT contains configurable elements AP1, AP2, MOD which can be configured according to one of the configurations Bk, K-KN1, K-KN2 by the configuration manager KM. Parameters of a radio interface IF are specified by way of example. In general any configurable elements can be provided, and multiple basic configurations BK and multiple communication-network-specific configurations K-KN1, K-KN2 may be present.

Currently the mobile terminal is using a first communication network KN1. The configurable elements are configured according to the configuration K-KN1. For this purpose the configuration manager receives information about which communication network is currently being used from a connection manager VM of the mobile terminal MT. The connection manager VM activates the communication-network-specific configuration K-KN1 for said communication network KN1, i.e. it configures the configurable elements according to said configuration K-KN1. The communication network KN1 or a reconfiguration manager RM1 can modify the configuration K-KN1 specific to this communication network KN1 via a reconfiguration interface RM1 of the interface.

FIG. 1 shows the mobile terminal MT as well as several communication networks KN1, KN2, KN3. The mobile terminal MT contains a basic configuration BK and e.g. two communication-network-specific configurations K-KN1, K-KN2. No communication-network-specific configuration is yet present for the third communication network KN3. Each of said communication networks KN1-KN3 contains a reconfiguration manager RM1, RM2, RM3 which can modify the configuration of the mobile terminal MT during ongoing operation.

The first reconfiguration manager RM1 can modify the first configuration K-KN1, and moreover to the extent that is permitted by the basic configuration BK. The second reconfiguration manager RM2 can modify the second configuration K-KN2, and moreover to the extent that is permitted by the basic configuration BK.

No communication-network-specific configuration is present for the third reconfiguration manager RM3 in the scenario depicted, e.g. because the mobile terminal MT has never before used the third communication network KN3 or because a configuration specific thereto has been deleted again, e.g. if the mobile terminal MT has only provided memory space for two communication-network-specific configurations K-KN1, K-KN2.

If the mobile terminal MT now logs on to the third communication network KN3, a new, third configuration K-KN3 is initialized which is specific to the communication network KN3. Said configuration is based on the basic configuration BK. That is to say, initially there is no difference between the configuration specific to the third communication network KN3 and the basic configuration BK. The third reconfiguration manager RM3 can now modify the configuration K-KN3 within the scope of the possibilities defined by the basic configuration BK. The third communication network KN3 or its reconfiguration manager RM3 does not have the option to modify, nor in particular to inspect, the configurations K-KN1 or K-KN2. This means that the third communication network KN3 learns nothing about the special configuration K-KN1, K-KN2 of other communication networks KN1, KN2, at least via this route. This prevents a network operator learning internal details of the configuration currently used by a competitor.

If the mobile terminal MT has only provided memory space for two communication-network-specific configurations K-KN1, K-KN2, when it sets up the third configuration K-KN3 it deletes an existing communication-network-specific configuration, for example the first configuration K-KN1.

If the mobile terminal MT now performs a handover procedure to the second communication network KN2, it again activates the still present second configuration K-KN2 which is specific to the communication network KN2. The changes which the third communication network KN3 or its configuration manager RM3 has performed have no effect on the second configuration K-KN2.

If the mobile terminal MT now executes a handover procedure to the first communication network KN1, there is no longer any communication-network-specific configuration present for it, since said configuration was deleted previously. This means that the mobile terminal MT must delete an existing communication-network-specific configuration, for example the third configuration K-KN3, in order to provide memory space for a configuration K-KN1 specific to the first communication network KN1. Since the changes to be made by the first configuration manager RM1 are no longer available, the configuration K-KN1 is initially identical to the basic configuration BK. The desired changes compared to the basic configuration BK must be made once again.

Figure 2A:
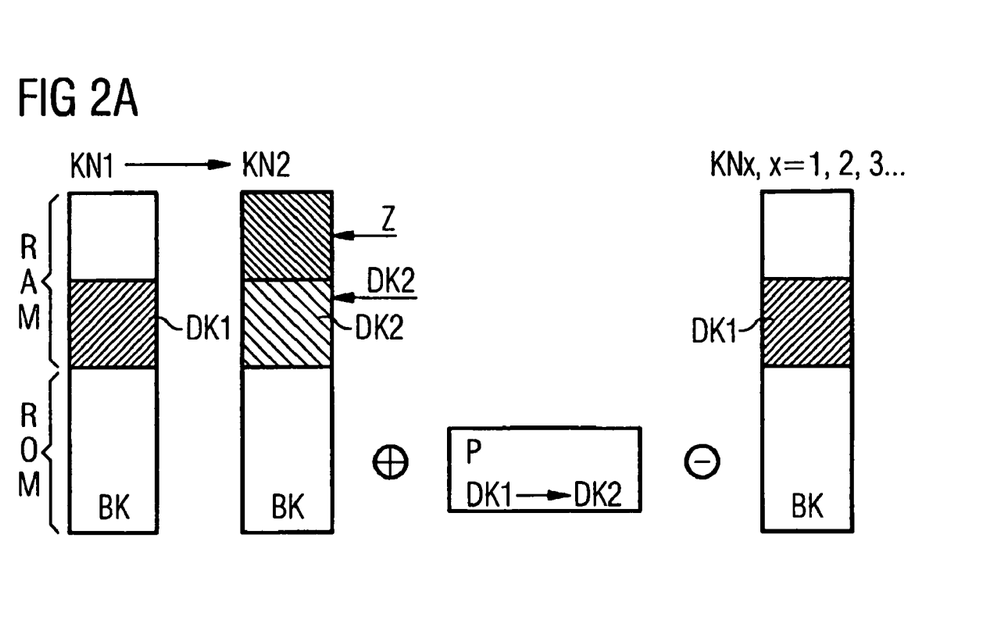
FIG. 2, 2B show configuration memory allocations of a memory of the mobile terminal of two embodiments.

FIG. 2A shows an example of configuration settings which are stored permanently or temporarily in the memory M of the mobile terminal MT or in corresponding memory areas. Data of a basic configuration BK is distributed for example over memory areas in a read-only memory ROM and memory areas in a rewritable direct access memory RAM (Random Access Memory). In this way configuration data of the basic configuration BK which must not be changed under any circumstances is stored in the non-writable or non-overwritable memory area ROM.

Other, reconfigurable data can be stored in the overwritable memory area RAM. Data stored in this area can be overwritten or modified, in particular by the user of the mobile terminal MT personally or by the service provider or the home network, if the mobile terminal MT is to be operated with a modified configuration from this moment in time. Data in this modifiable section may be not only data that is relevant for access to networks of the most disparate kinds physically, but also data that is relevant only to selected networks such as the home network. This data or part of this data is in particular data of a differentiatable or modifiable differential configuration DK1 for the first communication network KN1.

If the mobile terminal MT switches from the first communication network KN1 to the second communication network KN2, data in the modifiable memory area RAM is modified or overwritten by the second communication network KN2 or by its reconfiguration manager RM2 by means of corresponding differential configuration data DK2 and possibly supplementary data Z. The changes made are also logged in a log memory area P. As a result of this reconfiguration the mobile terminal MT is set to a configuration state optimized for the second communication network KN2.

When a switch is made from the second communication network KN2 to a further communication network KNx, where x=1, 2, 3, . . . , in a first step the reconfiguration is reversed, for which purpose the log entries in the log memory area P are used. Next, a reconfiguration is then performed in accordance with the predefined settings of the now contacted communication network KNx.

Figure 2B:
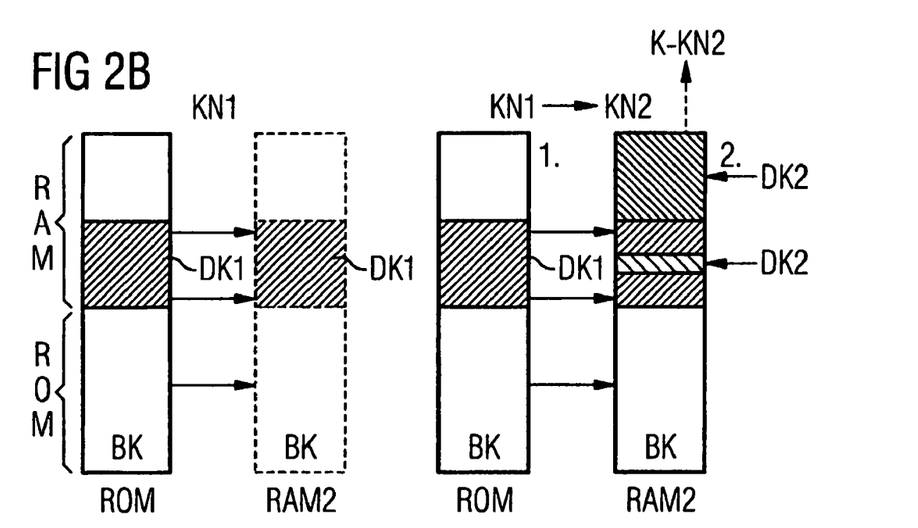

FIG. 2B shows an alternative or possibly combinable embodiment of the management of configuration data in the memory device M. In this embodiment the basic configuration BK is stored in a memory area ROM, RAM, said memory area ROM, RAM being not modifiable at all or only modifiable by authorized entities such as the user of the mobile terminal MT or the home network of same. This ensures that in the mobile terminal MT there is always a basic configuration with possibly adaptations or a first differential configuration DK1 to a selected home or first network available. In addition the mobile terminal MT comprises a further memory area RAM2 in which the configuration to be used by the mobile terminal MT in each case is stored. If the mobile terminal MT is located in the first communication network KN1 which is to be, for example, its home network, a copy of the contents from the first memory area with the basic configuration BK and the first differential configuration DK1 is located in the second memory area RAM2.

When a switch is made to the second communication network KN2 the contents of the second memory areas RAM2 are overwritten by the contents of the first memory area ROM, RAM, with the result that the basic configuration BK and possibly all or part of the differential configuration DK1 are present in the second memory area for the further operation of the mobile terminal MT. Moreover data of a second differential configuration DK2 is stored over the memory contents or stored in addition in the second memory area RAM2, said data of the second differential configuration DK2 being specific to the second communication network KN2. This data of the second differential configuration DK2 is preferably transferred to the mobile terminal MT on the initiative of the second reconfiguration manager RM2 which is assigned to the second communication network KM2.

When the mobile terminal MT logs out from the second communication network KN2 or switches to another communication network KN1, KN3, the previously performed reconfiguration is canceled again, i.e. the basic configuration BK and possibly a first differential configuration DK1 is loaded back into the second memory area RAM2 and further contents from an older configuration in said second memory area RAM2 are deleted.

A configuration from the second memory area RAM2 preferably can also be stored as a network-specific configuration K-KN2 in this or a further memory area either permanently or for a limited further period of time so that it will be possible on a future visit to the second communication network KN2 to refer directly to said second configuration K-KN2 without the need to retransmit the data to the mobile terminal MT via the radio interface.

Figure 3A:
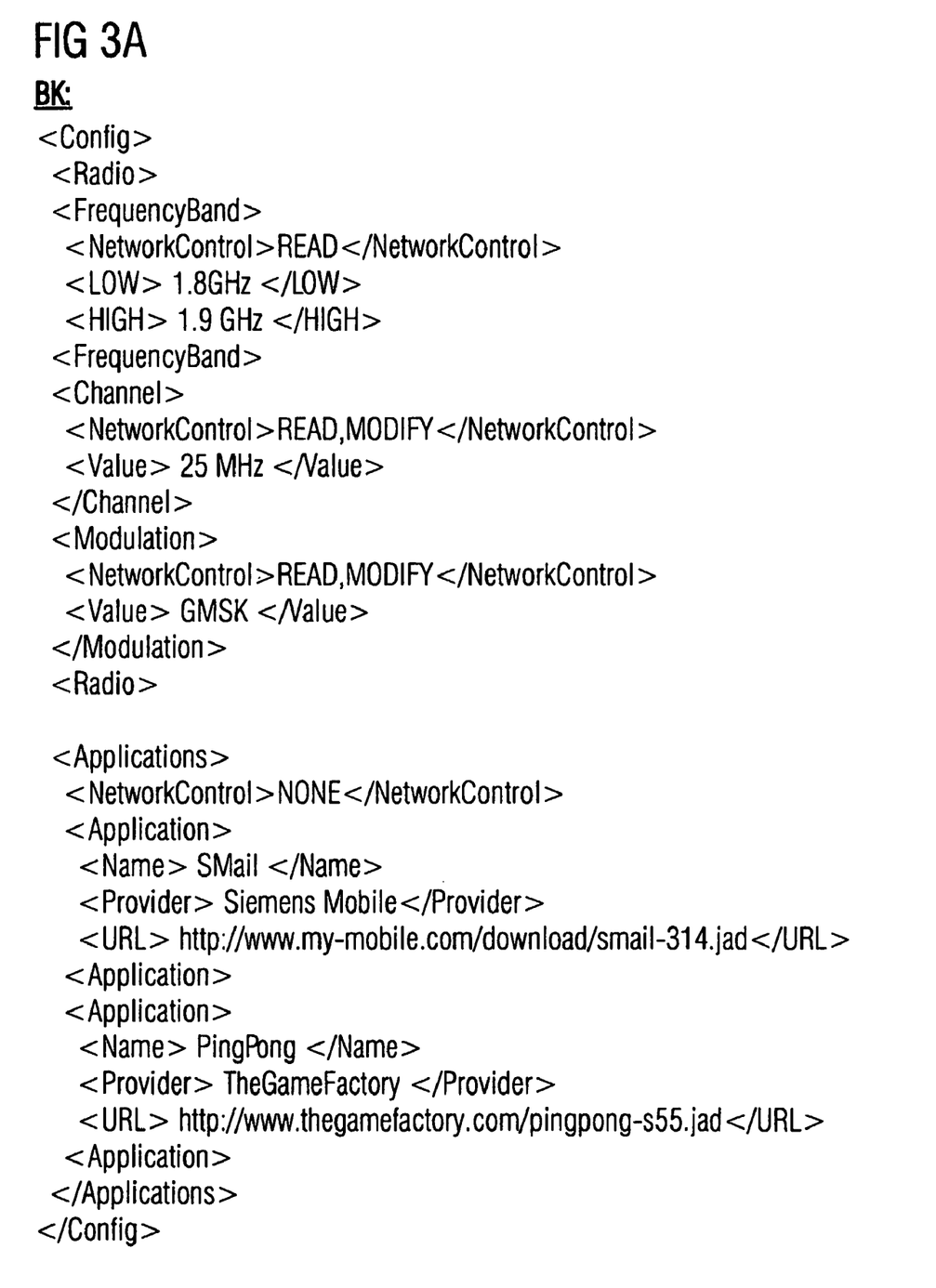
FIG. 3A shows a configuration programming example for a basic configuration.

With reference to FIG. 3A a configuration description for a basic configuration BK is specified by way of example. Said basic configuration BK defines the permitted frequency range, e.g. lower and upper end, the channel coding and the modulation method. It also contains a list of installed applications.

Said basic configuration BK specifies (<NetworkControl>READ), that a communication network KNx, where x=1, 2, 3, may read the element FrequencyBand, but can also read and modify the elements Channel and Modulation (READ, MODIFY). This means that in this case a communication network KNx cannot change the permitted frequency range, but within this frequency range can modify the channel spacing (Channel) and the modulation method.

An entry NONE under Applications means that a communication network KNx can neither query which applications are installed nor add new applications.

Figure 3B:
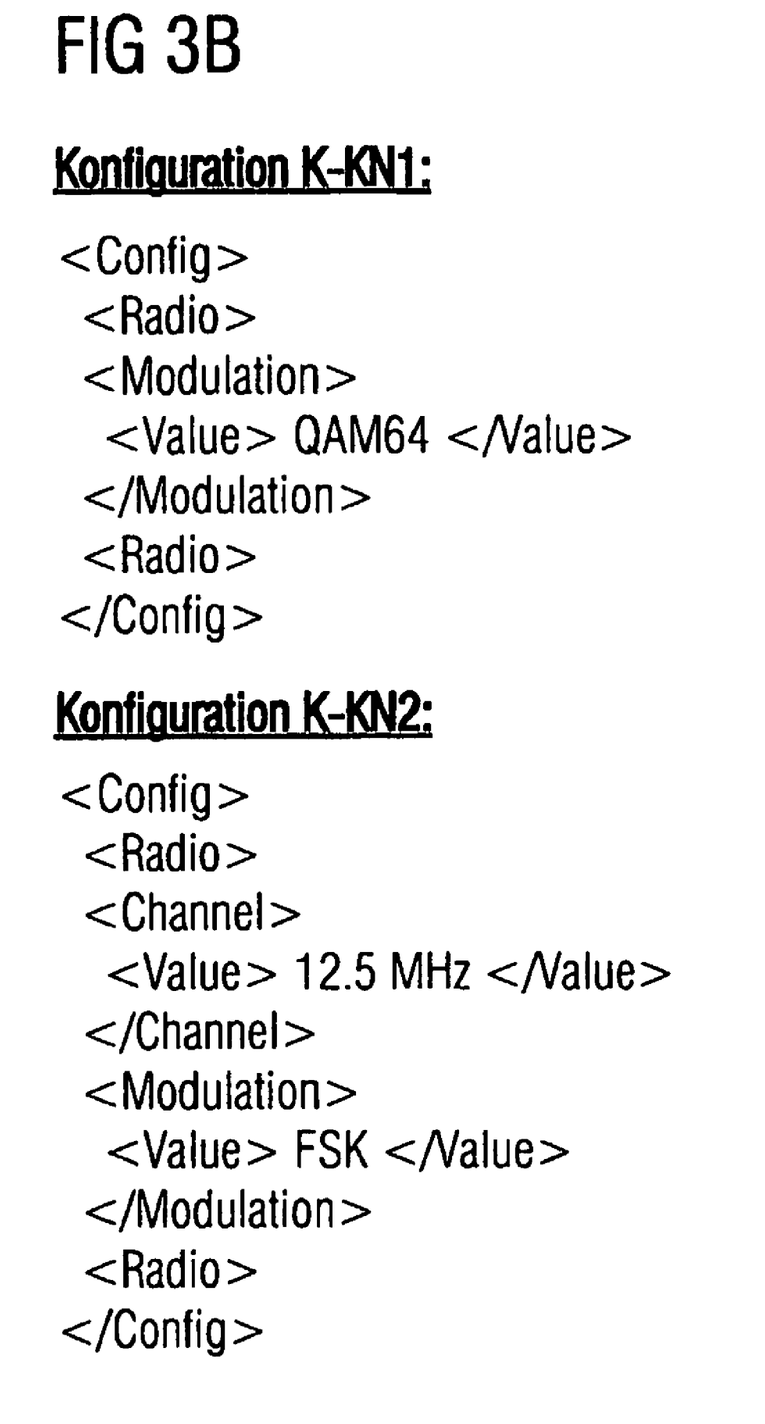
FIG. 3B shows two special configurations of two different networks for reconfiguring the mobile terminal compared to the basic configuration.

With reference to FIG. 3B, two communication-network-specific configurations K-KN1, K-KN2 are specified, with only the differences compared to the basic configuration being shown.

The first communication network KN1 uses a different modulation method, e.g. QAM64, from that provided for the radio interface (Radio) according to the basic configuration BK or other networks.

The second communication network KN2 uses a different channel spacing (Channel 12.5 MHz) and a different modulation method, e.g. FSK.

Figure 4A:
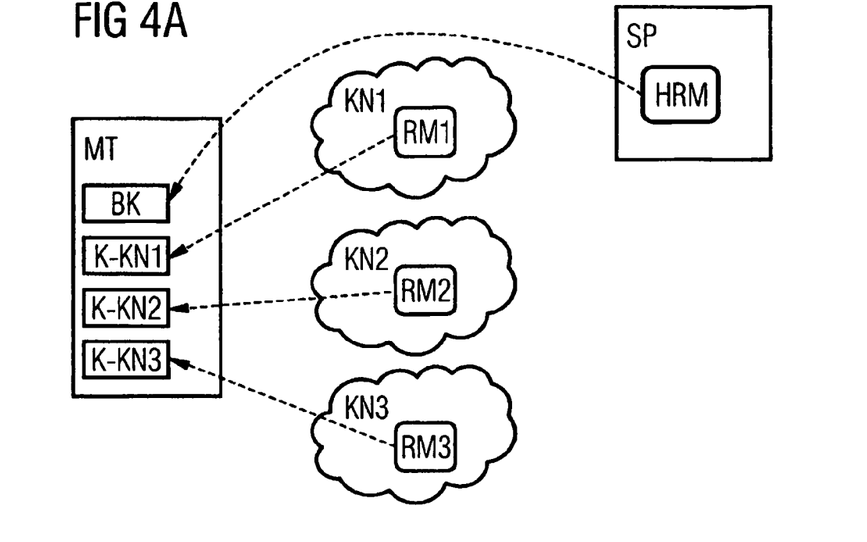
FIG. 4A-4F show different embodiments to illustrate different configuration possibilities in such a system composed of mobile terminal and different networks.

FIG. 4A illustrates a scenario in which a service provider SP defines the basic configuration BK using a Base or Home Reconfiguration Manager HRM, while the communication-network-specific configurations K-KN1, K-KN2, K-KN3 are defined by the respective communication network KN1, KN2, KN3. The dotted arrows indicate which nodes define which configuration.

In this scenario the service provider SP is a stakeholder that does not necessarily operate its own communication network KNx. However, if it operates one or more communication networks KN1 itself, it has the possibility of defining the basic configuration BK in such a way that no communication-network-specific modifications are necessary when one of its own communication networks KN1 is used.

Since in this case the communication-network-specific configurations K-KN1 are identical to the basic configuration BK, a variant is useful in this case. The mobile terminal MT differentiates between home networks KN1 which are operated by its service provider SP and other visited networks KN2, KN3 which are visited e.g. via roaming. According to a variant, a communication-network-specific configuration K-KN2, K-KN3 is created only for such communication networks KN2, KN3 that are not operated by the service provider SP of the subscriber or user of the mobile terminal MT. In this case the service provider SP makes desired changes directly to the basic configuration BK.

Figure 4B:
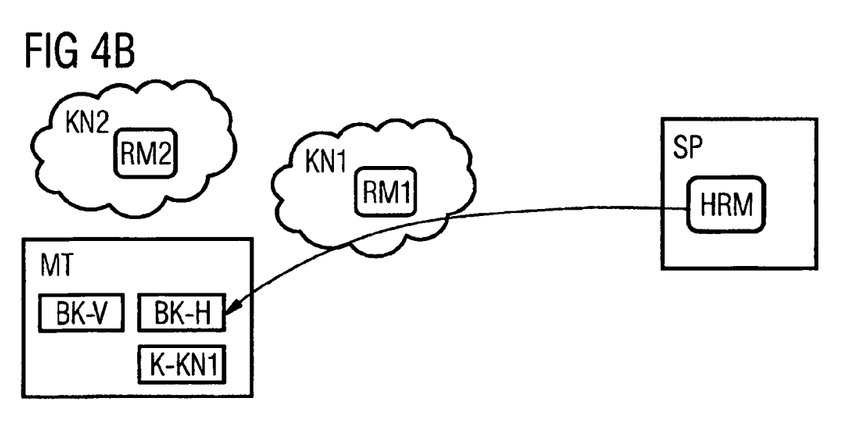

According to a further variant, as illustrated in FIG. 4B, two basic configurations BK-V and BK-H are used, both of which are defined by the service provider SP. The second, additional configuration is the basic configuration BK-V, which is used as the basis for the communication-network-specific configurations K-KN2 which belong to such communication networks KN2 that are not operated by the service provider SP. Conversely, the first basic configuration BK-H is used when a communication network KN1 operated by the service provider SP of the user is used. Either, as in the case of the above-described variant, the first basic configuration BK-H is used directly without setting up a communication-network-specific configuration K-KN1 or a communication-network-specific configuration is set up, albeit in this case by the first basic configuration BK-H. According to this variant it is possible that a communication network KN1 operated by the service provider SP can modify its communication-network-specific configuration more extensively than could a communication network that it not operated by the service provider SP itself.

The setting up, i.e. the creation or modification, of a communication-network-specific configuration K-KN1 can be performed autonomously by the mobile terminal MT. This means that without explicit signaling by the communication network KN1 or by the service provider SP a communication-network-specific configuration K-KN1 is set up which initially is identical in particular to the basic configuration. Equally it is possible that a communication-network-specific configuration K-KN1 is set up from within the network, in particular by a reconfiguration manager RMx or HRM. In this case corresponding signaling is effected by the corresponding node of the communication network KN1 to the mobile terminal MT.

A communication-network-specific configuration K-KNx, where x=1, 2, 3, for a communication network KNx can be set up, for example, when the mobile terminal MT logs on to the communication network KNx, when using the communication network KNx, as soon as a modification compared to the basic configuration BK is to be made, as soon as the communication network KNx is detected by a monitoring procedure of the mobile terminal, or as soon as the communication network KNx is detected by a monitoring procedure of the terminal, but only after a check has been made to verify whether the communication network KNx can potentially be used, i.e. whether a successful logon process is possible, in particular whether roaming into this network is possible.

Figure 4C:
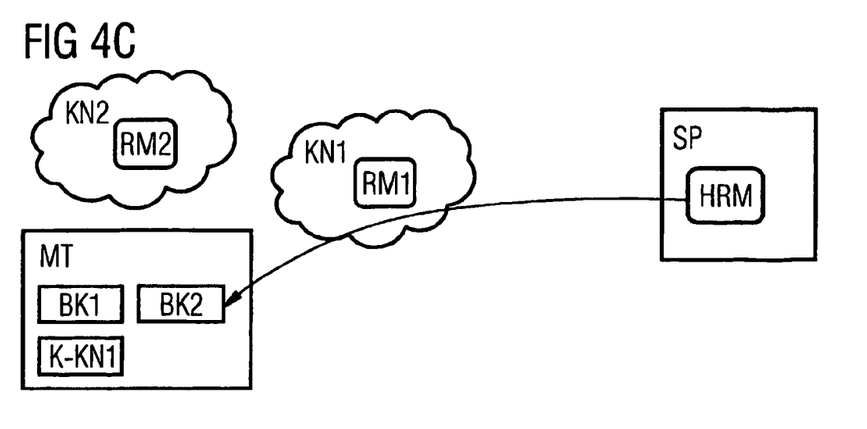

In the exemplary embodiments described, only one basic configuration BK was used in each case. It is however also possible that a plurality of basic configurations BK1, BK2 are present, as can be seen in FIG. 4C. Which basic configuration BK1, BK2 is to be used in this case as a basis for a particular communication-network-specific configuration can be specified by the service provider, selected by the user or determined by the affected communication network KN1, KN2. Advantageously a general basic configuration BK is defined as well as one or more special basic configurations specifically tailored to some or a plurality of communication networks. If a specially defined basic configuration is present, this will be used; otherwise the general basic configuration will be used.

By means of a decision by the service provider SP the home reconfiguration manager HRM can set up a specific basic configuration BK2 for a communication network for which none is yet present, e.g. in order to prepare an actual handover or merely to prepare a suitable configuration for potentially usable communication networks generally. In this case it is advantageous in particular if the service provider SP that knows the location or, as the case may be, the currently used communication network KN1, e.g. by means of mobility management procedures, using data that specifies which other potential communication networks KN2 are actually present or at least probably or potentially present in this location, sets up specific basic configurations BK1, BK2 for probably or potentially usable communication networks KN1, KN2. The information on currently or potentially possible communication networks KN1, KN2 can be fixed, in particular configured, or determined dynamically by means of mode monitoring.

In the variant illustrated in FIG. 4C, the mobile terminal MT currently uses the first communication network KN1 with the associated communication-network-specific configuration K-KN1. The home reconfiguration manager HRM of the service provider SP now contains data that specifies that the second communication network KN2 is also available at the location of the mobile terminal MT or in its vicinity. For this reason the home reconfiguration manager HRM decides to set up a specific second basic configuration BK2 provided therefor, doing so in particular using the existing communication via the first communication network KN1.

Figure 4D:
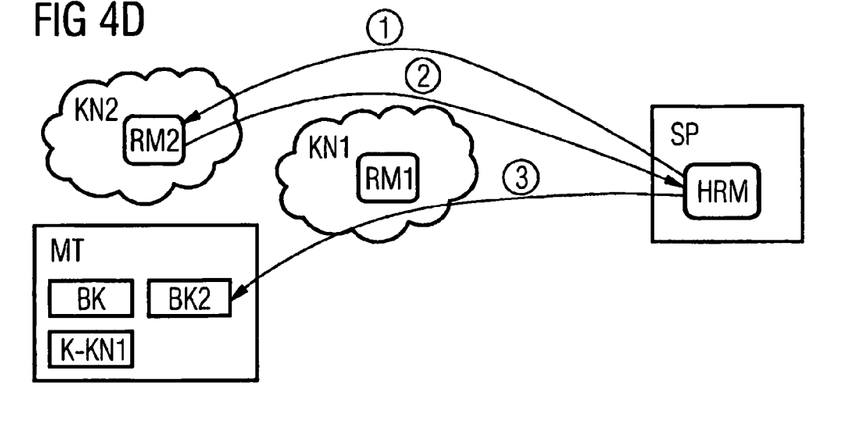

According to a variant illustrated in FIG. 4D, the home reconfiguration manager HRM first interrogates the reconfiguration manager RM2 of the second communication network KN2 for the configuration preferences (step 1), e.g. which parameters/parts of a configuration can be fixed and which are to be adaptively modifiable. The home reconfiguration manager HRM thereupon receives said preferences from the second reconfiguration manager RM2 (step 2), compares these with its own preferences and determines a specific basic configuration BK2 which on the one hand corresponds to its own preferences, yet on the other hand also takes into account the wishes of the second network KN2. This particular basic configuration BK2 is set up by the home reconfiguration manager HRM on the mobile terminal MT (step 3). This variant has the advantage that the specific basic configuration BK2 can take into account special requirements or wishes of a communication network KN2. In particular it is possible in the specific basic configuration BK2 to apply settings which the service provider SP is not ready to transfer directly to the control of a communication network while it is marked as modifiable in the basic configuration.

According to a further variant, the second reconfiguration manager RM2 of the second network KN2 can signal requests for changes to the configuration which, however, the second reconfiguration manager RM2 cannot or may not perform itself to the home reconfiguration manager HRM. The latter can then decide whether it will implement said requested changes in the second basic configuration BK2 or not. This case is relevant when the service provider SP does not want to grant the second communication network KN2 any direct control over the configuration. The second reconfiguration manager RM2 could, for example, be a hotspot operator rated as not very trusted. Nevertheless it is possible to set up and use a basic configuration BK2 specific to the second network KN2.

Figure 4E:
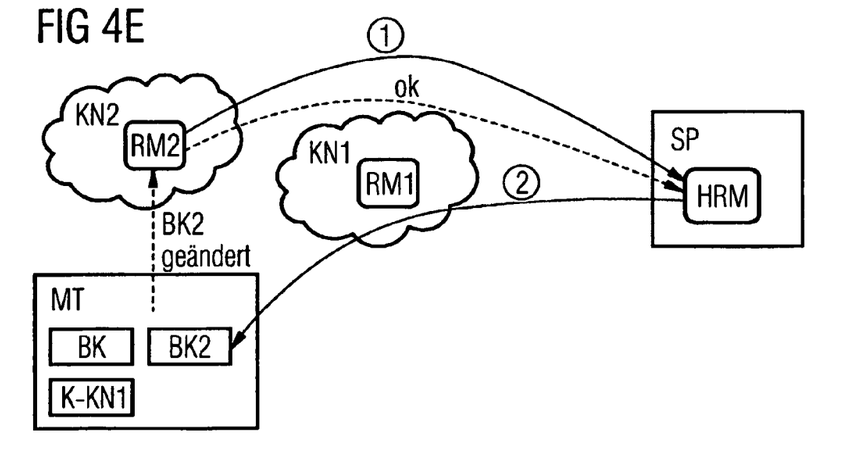

FIG. 4E shows the case where the home reconfiguration manager HRM is ready to carry out the change request. In step 1 the second reconfiguration manager RM2 signals the change request to the home reconfiguration manager HRM. In step 2 the home reconfiguration manager HRM carries out the requested change to the second basic configuration BK2. Optionally the home reconfiguration manager HRM can signal to the second reconfiguration manager RM2 that the change has been accepted (OK message between step 1 and step 2) or when the change has been made (OK message following step 2). In addition the mobile terminal MT can optionally signal to the second reconfiguration manager RM2 that the specific basic configuration BK2 has been modified.

Figure 4F:
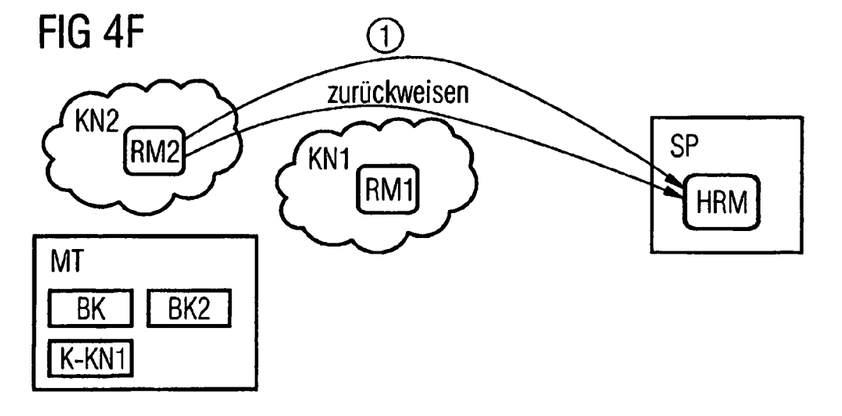

FIG. 4F shows the case where a requested change to the second basic configuration BK2 is rejected by the home reconfiguration manager HRM. In this case the home reconfiguration manager HRM sends a reject message to the second reconfiguration manager RM2 in response to the signaling of the change request in step 1.

We claim:

1. A method for configuring a mobile terminal after the mobile terminal leaves a communication network, which comprises the steps of:
   setting up a basic configuration for use of the mobile terminal in differently organized communication networks in the mobile terminal;
   modifying the basic configuration for use of the mobile terminal in a particular communication network of the communication networks by means of a change;
   loading data, which implements the change, for a specific configuration specific to the particular communication network into the mobile terminal and the change remains available in the mobile terminal during the use of the mobile terminal in the particular communication network;
   reversing the change for the specific configuration for use of the mobile terminal in the particular communication network following the use in the particular communication network; and
   permitting the change for the specific configuration for use of the mobile terminal in the particular communication network only by certain of the communication networks and/or by previously approved authorities.

2. The method according to claim 1, which further comprises one of deleting and deactivating the change for the specific configuration for use of the mobile terminal in the particular communication network and wherein the deleting and deactivating of the change is performed by the mobile terminal when the certain of the communication networks and/or the previously approved authorities is not permitted to perform the change.

3. The method according to claim 1, which further comprises modifying only permitted areas of the basic configuration during formulation of the change for the specific configuration for use of the mobile terminal in the particular communication network.

4. The method according to claim 1, which further comprises initiating the change for the specific configuration for use of the mobile terminal in the particular communication network and/or the loading of the data for the change of the specific configuration by a visited communication network.

5. The method according to claim 1, which further comprises storing the change for the specific configuration for use of the mobile terminal in the particular communication network independently for a later use in the particular communication network.

6. The method according to claim 1, which further comprises retrieving the data for the change for the specific configuration for use of the mobile terminal in the particular communication network from a memory of the mobile terminal.

7. The method according to claim 1, which further comprises retrieving the data for the change for the specific configuration for use of the mobile terminal in the particular communication network from the particular communication network.

8. The method according to claim 1, wherein the change to the data for the specific configuration corresponds to a reconfiguration of the basic configuration and/or a supplementary configuration of the basic configuration.

9. The method according to claim 1, which further comprises permitting the change for the specific configuration for use of the mobile terminal in the particular communication network only for permitted values or a permitted value range.

10. The method according to claim 1, which further comprises storing the change for the specific configuration for use of the mobile terminal in the particular communication network independently for a later use in the mobile terminal.

11. A mobile terminal, comprising:
a memory device for storing at least one basic configuration being set up for use of the mobile terminal in differently organized communication networks, and for storing additional data, the mobile terminal thus being configurable for use in the differently organized communication networks;
a control device for controlling functions of the mobile terminal and connected to said memory device;
an interface device enabling the mobile terminal to communicate with a network station of one of the communication networks;
said control device and said memory device embodied for modifying the basic configuration for use of the mobile terminal in a particular communication network of the communication networks by means of a change, in addition to load further data for a specific configuration specific to the particular communication network into the mobile terminal via said interface device, and to use the change during the use of the mobile terminal in the particular communication network and keep the change available;
said memory device having a first memory area for permanently storing the basic configuration and a second memory area for temporarily storing a copy of a reconfigured basic configuration reconfigured by the change as the specific configuration for use of the mobile terminal in the particular communication network; and
said control device and said memory device being set up and embodied to permit the change for use of the mobile terminal only by certain ones of the communication networks and/or by previously approved authorities or a user of the mobile terminal.

12. The mobile terminal according to claim 11, wherein said control device and said memory device are set up and embodied to reverse the change following the use of the mobile terminal in the particular communication network.

13. The mobile terminal according to claim 11, wherein said control device and said memory device are set up and embodied to store the further data for the change for a later use of the mobile terminal in the particular communication network separately.

14. The mobile terminal according to claim 11, wherein said control device and said memory device are set up and embodied to permit the change for use of the mobile terminal in the particular communication network only in respect of particular parameters of the basic configuration.

15. A communication network for setting up and operating a communication connection to the mobile terminal according to claim 11, the communication network comprising:
a network device for providing data transmitted to the mobile terminal via the communication connection, the communication network providing, as the data, configuration data for the change to the basic configuration of the mobile terminal, for a subsequent operation of the mobile terminal with the communication connection to the particular communication network.

16. The communication network according to claim 15, further comprising a configuration manager embodied for providing the configuration data.

17. The communication network according to claim 15, further comprising a configuration manager embodied and set up for activating the change in the mobile terminal.

18. A method for configuring a mobile terminal after the mobile terminal leaves a communication network, which comprises the steps of:
setting up a basic configuration for use of the mobile terminal in differently organized communication networks in the mobile terminal, various ones of the communication networks differ in respect of connection-relevant parameters for a communication connection that is to be set up;
modifying the basic configuration for use of the mobile terminal in a particular communication network of the communication networks by means of a change;
loading data, for implementing the change, for a specific configuration specific to the particular communication network into the mobile terminal and the change remains available in the mobile terminal during the use of the mobile terminal in the particular communication network;
reversing the change for the specific configuration for use of the mobile terminal in the particular communication network following the use in the particular communication network; and
permitting the change for the specific configuration for use of the mobile terminal in the particular communication network only by certain of the communication networks and/or by previously approved authorities.

19. A mobile terminal, comprising:
a memory device for storing at least one basic configuration being set up for use of the mobile terminal in differently organized communication networks, and for storing additional data, the mobile terminal thus being configurable for use in the differently organized communication networks and various ones of the communication networks differ in respect of connection-relevant parameters for a communication connection that is to be set up;
a control device for controlling functions of the mobile terminal and connected to said memory device;
an interface device enabling the mobile terminal to communicate with a network station of one of the communication networks;
said control device and said memory device embodied for modifying the basic configuration for use of the mobile terminal in a particular communication network of the communication networks by means of a change, in addition to load further data for a specific configuration specific to the particular communication network into the mobile terminal via said interface device, and to use the change during the use of the mobile terminal in the particular communication network and keep it available;
said memory device having a first memory area for permanently storing the basic configuration and a second memory area for temporarily storing a copy of a reconfigured basic configuration reconfigured by the change as the specific configuration for use of the mobile terminal in the particular communication network; and said control device and said memory device being set up and embodied to permit the change for use of the mobile terminal only by certain ones of the communication networks and/or by previously approved authorities or a user of the mobile terminal.

20. A communication network for setting up and operating a communication connection to the mobile terminal according to claim 11, the communication network comprising:

a network device for providing data transmitted to the mobile terminal via the communication connection, the communication network providing, as the data, configuration data for the change to the basic configuration of the mobile terminal, for a subsequent operation of the mobile terminal with the communication connection to the particular communication network, and various ones of the communication networks differ in respect of connection-relevant parameters for a communication connection that is to be set up.

* * * * *